Nov. 12, 1963  W. L. BERNER  3,110,510
COUPLER
Filed Nov. 22, 1961
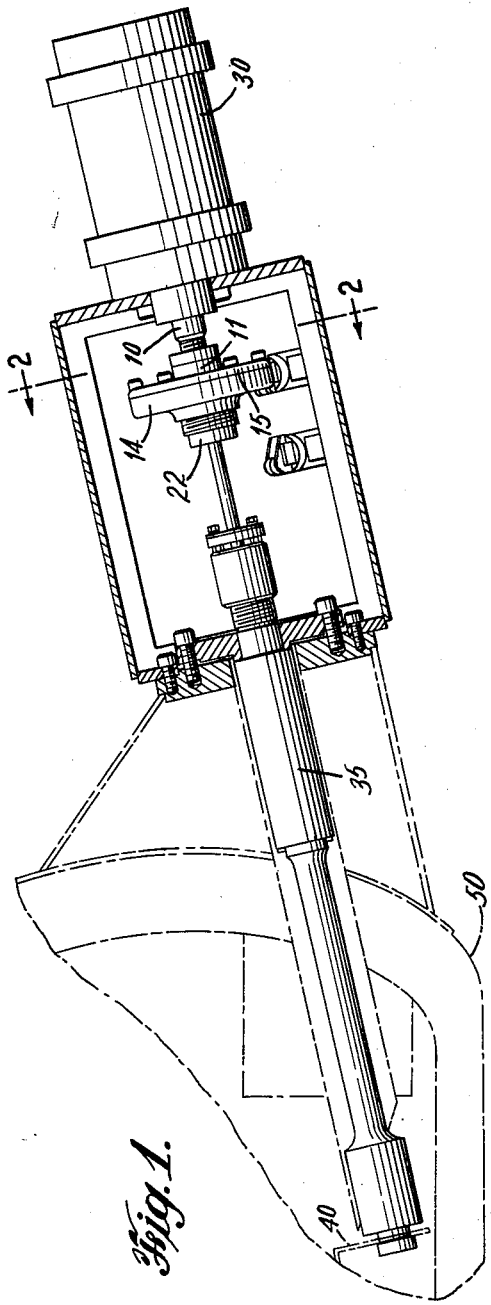
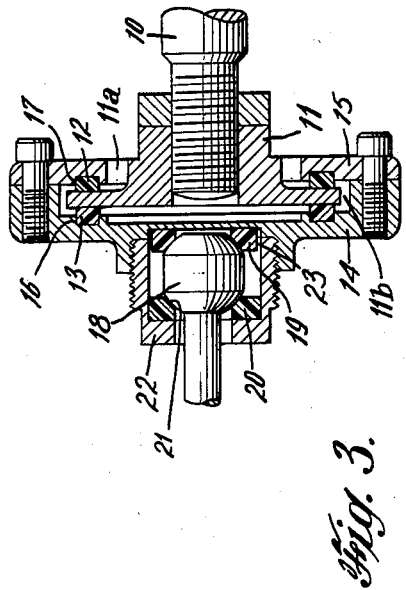
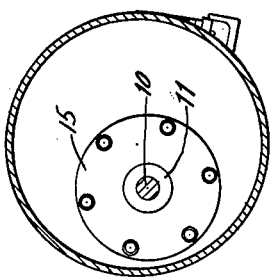
INVENTOR.
WILLIAM L. BERNER
BY Richard S. Sherens Jr.
ATTORNEY

United States Patent Office 3,110,510
Patented Nov. 12, 1963

3,110,510
COUPLER
William L. Berner, Indianapolis, Ind., assignor to Union Carbide Corporation, a corporation of New York
Filed Nov. 22, 1961, Ser. No. 154,299
5 Claims. (Cl. 287—129)

This invention relates to couplers, and more particularly to devices of this character for transmitting the reciprocating motion of a mechanical element to another mechanical element. For example, in supplying cryogenic liquids, it is often desirable that the pump utilized to supply the liquid from its storage tank be immersed within the tank for a more effective insulation of the pump, the driving mechanism for the pump being positioned outside ot the tank.

In such systems, the coupler serves the purpose of allowing for any axial or angular misalignment between the driving element and the driven element. In prior art devices, a particular type of coupling arrangement had to be designed for one or the other of these two types of misalignment. That is, prior art couplers have been incapable of providing for both the axial and angular misalignment. For example, a ball and socket type of coupler could compensate for the angular, but not the axial misalignment. Axial alignment has primarily been compensated for by a ball and clevis arrangement wherein either the driving member is firmly anchored to prevent rotation or the driven member is channeled according to the angular rotation of the driving member. Such an arrangement was complicated because of the mechanisms involved and was, therefore, not too reliable.

It is therefore the main object of the present invention to provide a coupler which very simply and effectively compensates for both the axial and angular misalignment between the driving and driven members. According to the invention, a driving member is connected to a flanged drive member of the coupler, the flange of which is slidably engaged between a pair of low friction rings that are suitably positioned within a housing that is intermediate the driving member and the driven member. The driven member comprises a ball connector rotatably engaged between another pair of low friction rings that are suitably encased within a housing that is connected to the intermediate housing. With this arrangement the flanged drive member is free to take up any axial misalignment while the ball-type driven member takes up any angular misalignment.

In the drawings:
FIG. 1 is a vertical section through apparatus employing the coupler according to the preferred embodiment of the invention;
FIG. 2 is a cross section taken along line 2—2 of FIG. 1; and
FIG. 3 is an enlarged cross section through the coupler.

Referring to FIG. 3, the driving member consists of a piston rod 10 that is connected to a flanged drive member 11. The piston rod may be connected to the flanged member by any suitable means such as a threaded joint. Flanged drive member 11 is circular in cross section. It may be constructed of any suitable metal such as stainless steel. The flanged portion is slidably engaged in a pair of rings 12 and 13 which are held into place by the intermediate housing 14 and its cap 15. These rings are preferably constructed of polytetrafluoroethylene for minimum friction between the rings and the flanged member. Other materials exhibiting like properties could also be used. Housing 14 and cap 15 are also constructed from a suitable metal such as stainless steel.

To assemble this portion of the coupler, ring 13 is placed into a suitable groove 16 of the housing 14. Flange drive member 11 is then centrally aligned within the housing and placed on top of the ring. Ring 12 is then positioned and cap 15 placed over the ring in groove 17 and then bolted down to housing 14.

The tightness of the fit between the rings and flange of the drive member is critical in this device. Specifically, the fit should be loose enough to permit ease of movement between the flange and the rings and yet be close enough to insure that there will not be too much "play" between the two. A fit having a clearance of from .001 to .003 inch would be suitable. It should be noted that either the clearance 11a between the drive member 11 and the cap 15 or the clearance 11b between the flanged portion of the drive member and the housing 14 will determine the magnitude of the axial misalignment that can be compensated for. Rings 12 and 13 need not be in exact axial alignment. It should be understood, however, that should the rings be excessively misaligned, say in the order of from ⅛ to ¼ inch, that undue stresses would be set up in the flange of the drive member. Should the loads become excessive, ring 13 could be replaced by a disk that would substantially cover the bottom surface of flange member 11. The disk would be fabricated from the same material as the rings. Another alternative would be to replace both rings by a pair of suitable thrust bearings.

The driven member consists of a ball connector 18 that is rotatably engaged within a socket consisting of a pair of rings 19 and 20. Rings 19 and 20 are suitably beveled 21 to mate the curved surface of the connector 18. They may be constructed from the same type of material as rings 12 and 13 or they may be constructed from a suitable metal such as an oil impregnated bronze, the only criteria being that there be a minimum of friction between the connector and the rings. The rings as well as the connector are enclosed by a housing 22. Again the housing may be constructed from a suitable metal such as stainless steel.

To assemble this portion of the coupler, ring 19 is centrally positioned against the housing 14. Ball connector 18 is then properly positioned, followed by ring 20. Housing 22 is then threaded to housing 14 so as to secure the rings and the connector. In this connection, it should be noted that it is necessary that there be a small amount of clearance 23 between either of the rings 19 or 20 and the housing 22 so that the rings and the connector can be centrally aligned.

Referring to FIGS. 1 and 3, the coupler is connected to an external driving force such as an air cylinder 30 through the piston rod 10. At the opposite end, the coupler is connected to an element to be driven, such as a connecting rod 35 for a reciprocating piston pump 40. Pump 40 could, for example, be positioned within cryogenic container 50. As the coupler reciprocates back and forth, in accordance with the movement of the cylinder and the piston, the flange member slidably moves between rings 12 and 13 in a plane perpendicular to the axis of the system while the axis of the flanged member remains parallel to the axis of the driven member. Thus, any axial displacement or misalignment is compensated for. Any angular displacement is compensated for by the rotation of the ball connector within rings 19 and 20.

It appears that none of the dimensions of the apparatus are critical. It should be understood that the size would be dependent upon the size of the pump that is to be driven and the resulting loads that would be imposed. For example, the size of the rings would be dependent upon the load imposed upon their bearing surfaces. Therefore, the following dimensions are presented by way of illustration only.

To illustrate, a 6 inch diameter air cylinder is used to drive a piston type immersion pump at the rate of 120 strokes per minute to pump a cryogenic liquid at the rate of 40 c.f.m. when vaporized to a gas. The cylinder operates at the rate of 120 c.f.m. at a pressure of 70 p.s.i.g. to exert a push-pull force of 2000 lbs. Under these conditions suitable dimensions for the coupler would be: intermediate housing 14—diameter 6 inches; diameter of the flange of the drive member 11—4½ inches; diameter of the ball portion of ball connector 18—1¼ inches; diameter of rings 12 and 13—4¼ inches, thickness ¼ inch; and diameter of rings 19 and 20—2 inches, thickness ⅜ inch.

What is claimed is:

1. A coupler for reciprocating drive and driven members to compensate for both axial and angular misalignment therebetween, comprising a radial surface on the end of one of said members, a ball on the mating end of the other of said members, and a partition interposed between said radial surface and said ball, a slide bearing on one side of said partition engaged by said radial surface, means for retaining said radial surface in radially sliding contact with said slide bearing, said retaining means having clearance for such radial sliding contact to allow for axial misalignment, a concentric socket on the other side of said partition receiving said ball, a bearing for said ball in said socket, and means for retaining said ball in said socket to allow for angular misalignment.

2. A coupler for reciprocating drive and driven members to compensate for both axial and angular misalignment therebetween, comprising a radial surface on one end of one of said members, a ball on the mating end of the other of said members, and a partition interposed between said radial surface and said ball, a slide bearing on one side of said partition engaged by said radial surface, a retainer secured to said partition outside of said radial surface retaining the same in radially sliding contact with said slide bearing, said partition having clearance for such radially sliding contact to allow for axial misalignment, a concentric socket on the other side of said partition receiving said ball, a bearing for said ball in said socket, and means for retaining said ball in said socket to allow for angular misalignment.

3. A coupler for reciprocating drive and driven members to compensate for both axial and angular misalignment therebetween, comprising a radial surface on the end of one of said members, a ball on the mating end of the other of said members, and a partition interposed between said radial surface and said ball, a slide bearing on one side of said partition engaged by said radial surface, means for retaining said radial surface in radially sliding contact with said slide bearing, said retaining means having clearance for such radial sliding contact to allow for axial misalignment, a concentric socket on the other side of said partition receiving said ball, and bearing rings in said socket retaining said ball therebetween to allow for angular misalignment.

4. A coupler for a piston rod and a connecting rod to compensate for both axial and angular misalignment therebetween, comprising a radial surface on the end of said piston rod, a ball on the mating end of said connecting end, and a disk interposed between said radial surface and said ball, a slide bearing on one side of said disk engaged by said radial surface, means for retaining said radial surface in radially sliding contact with said slide bearing, said retaining means having clearance for such radial sliding contact to allow for axial misalignment, a concentric socket on the other side of said disk receiving said ball, a bearing for said ball in said socket, and means for retaining said ball in said socket to allow for angular misalignment.

5. A coupler for reciprocating drive and driven members to compensate for both axial and angular misalignment therebetween, comprising a radial flange on the end of one of said members, a ball on the mating end of the other of said members, a housing between said members comprising a disk having a peripheral shoulder on one side and a smaller concentric socket on the other side, said disk having an annular bearing inside said peripheral shoulder engaged by said radial flange, a retaining ring secured to said peripheral shoulder and having a bearing complementary to said disk bearing to receive said radial flange therebetween for radial sliding movement therein, said peripheral shoulder and said retaining ring having clearance for such radial sliding movement between said complementary bearings to allow for axial misalignment, and bearing rings in said socket on the other side of said disk receiving said ball secured to the mating end of said other member to allow for angular misalignment.

References Cited in the file of this patent

UNITED STATES PATENTS

| | | |
|---|---|---|
| 1,297,729 | Picard | Mar. 18, 1919 |
| 1,614,480 | Lovejoy | Jan. 18, 1927 |